Nov. 12, 1940.  A. A. TRAMBLY  2,221,462
HYDRAULIC CONTROL VALVE
Filed Jan. 19, 1938  2 Sheets-Sheet 2
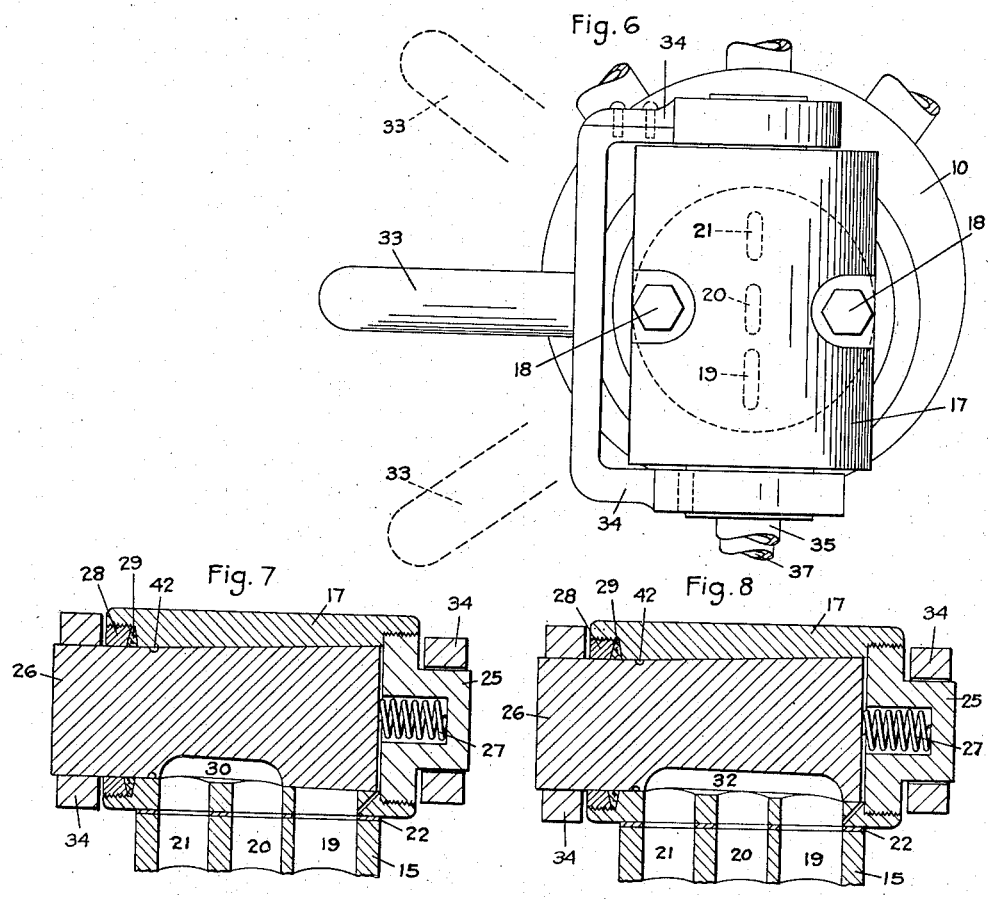
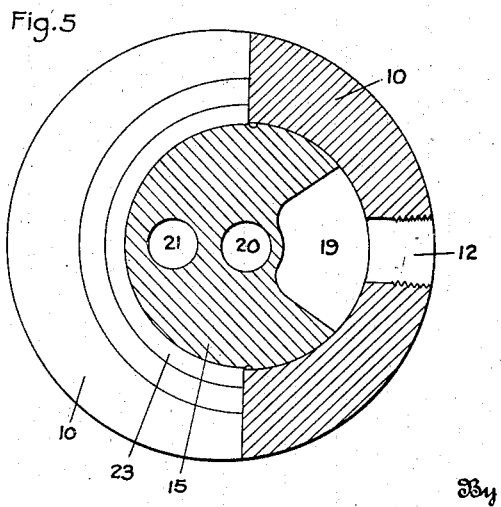
Inventor
Alfred A. Trambly
By *Emil F. Lange*
Attorney Patented Nov. 12, 1940

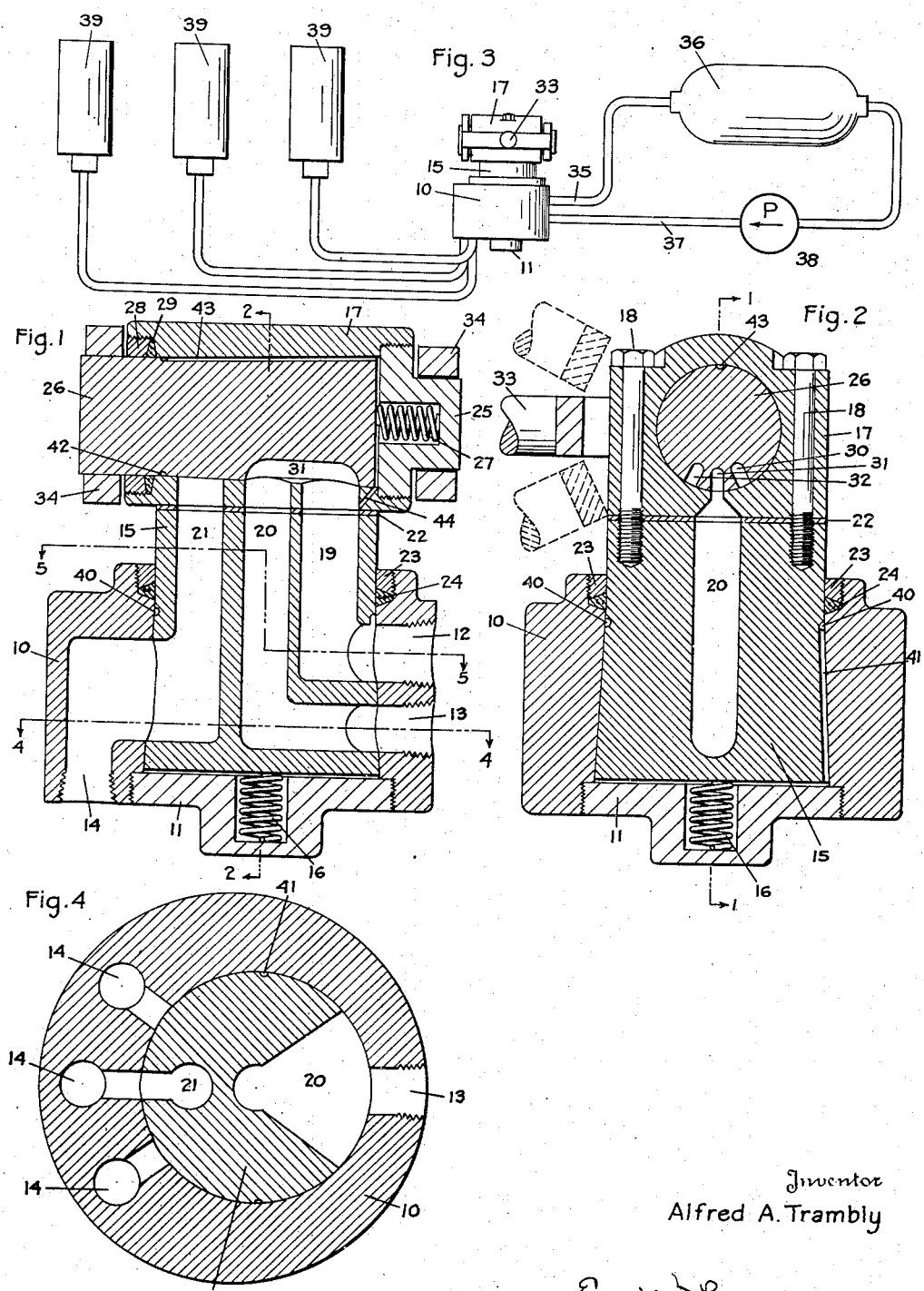

2,221,462

UNITED STATES PATENT OFFICE 2,221,462

HYDRAULIC CONTROL VALVE

Alfred A. Trambly, Lincoln, Nebr.

Application January 19, 1938, Serial No. 185,717

3 Claims. (Cl. 277—69)

My invention relates to hydraulic control valves for selectively controlling a plurality of jacks or rams, its primary object being the provision of a novel system for the operation of a plurality of hydraulic jacks or rams and of a mechanism for the control of a plurality of jacks or rams by means of a single lever.

Another object is the provision of a valve structure for controlling the operation of a plurality of jacks or rams, the structure being compact and simple and designed for almost instant operation.

Another object which I have in view is the provision of a lubricated valve structure in which there is no leakage of oil, but which is so designed as to prevent the building up of undesirable pressures in the oil by draining the oil into an oil reservoir.

Having in view these objects and others which will be pointed out in the following description, I will now refer to the drawings, in which Figure 1 is a view in vertical section of my hydraulic control valve.

Figure 2 is a vertical section of the same valve on a plane perpendicular to that of Figure 1, the plane of the section being indicated by the line 2—2 of Figure 1.

Figure 3 is a diagrammatic view of the entire valve system as applied for the control of three jacks or rams.

Figure 4 is a sectional view on the line 4—4 of Figure 1 as seen in the direction indicated by the arrows.

Figure 5 is a sectional view taken on the line 5—5 of Figure 1 as seen in the direction indicated by the arrows.

Figure 6 is a plan view of the valve and showing particularly the operating lever and its connections.

Figure 7 is a vertical sectional view showing the operating valve member in operative position.

Figure 8 is a view similar to Figure 7 but showing the operating valve member in releasing position.

The base 10 is in the form of a cylindrical casting arranged for supporting all of the moving parts of the valve and controls. It may be secured to a floor or platform in any suitable manner. The base 10 is provided with a frusto-conical cavity having a vertical axis, and the opening at the bottom of the base 10 is screw threaded for the reception of a plug 11. The base 10 also has two ports 12 and 13 which lie in a vertical plane and with a plurality of ports 14 lying in a horizontal plane. The ports 12, 13, and 14 are cylindrical and they are screw threaded for securing thereto certain connections to be subsequently described.

The base 10 with its cavity thus serves as the female member of a valve which is designed for the selection of the desired jack which is to be operated. Rotatably seated within the cavity of the base 10 is the male member 15 of the same valve. This is held in place by means of the plug 11 and the coiled spring 16 bearing against the lower or larger surface of the valve member 15. The block 17 is secured in horizontal position to the valve member 15 by means of screws or bolts 18 or the like as shown in Figure 2. The valve member 15 is provided with a passageway 19 communicating with the port 12, a passageway 20 communicating with the port 13, and a passageway 21 communicating with a selected one of the ports 14. These three passageways extend through the lower wall of the block 17, the gasket 22 being apertured so that the passageways are continuous to and through the lower wall of the block 17. The annulus 23 surrounds the valve member 15 and suitable packing 24 is compressed between the annulus 23 and the outer wall of the member 15 and the upper wall of the base 10. The valve member 15 is rotatable about its vertical axis in the base 10.

The block 17 is provided with a horizontally positioned frusto-conical cavity as best shown in Figure 1. This cavity is closed at one end by the plug 25. The male valve member 26 passes through this cavity and is urged into a tight relation in the cavity by means of the coiled spring 27. The annulus 28 surrounds the valve member 26 for making a tight joint between the two valve members 17 and 26, the joint being further tightened by means of packing 29. The upper valve, which may be regarded as the operating valve, consists of the female member 17 and the male member 26, the member 26 being rotatable in the member 17. Since the liquid used in both valves is oil under high pressure, it is necessary that the joints be tight during the rotation of the two valve members.

The valve member 26 is provided with three sockets 30, 31, and 32. Their shape is best shown in Figure 2. These sockets are somewhat elongated as shown in Figures 1, 7, and 8, but they are narrower than the passageways with which they communicate. The walls of the passageways through the lower wall of the block 17 are therefore inclined as shown in Figure 2. In the neutral position of the upper valve the socket 31 spans the openings to the two passageways 19 and 20 as shown in Figure 1. In the operative position the socket 30 communicates with the passageways 20 and 21 as shown in Figure 7. In the releasing position the socket 32 communicates with all three passageways 19, 20, and 21 as shown in Figure 8. These three positions are obtained by the rotation of the valve member 26 in the block 17.

For rotating the valve member 26 I employ a lever 33 which is keyed or otherwise secured to the projecting end of the valve member 26 and loosely secured to the projecting portion of the plug 25. The lever may assume any of the three positions shown in Figure 2 in order to bring one of the sockets into alignment with the selected passageways 19, 20, and 21. The lever is connected to a yoke having two arms 34 as best shown in Figure 6. By means of this construction the valve member 26 may be rotated within limits about its horizontal axis as shown in Figure 2, or the valve member 15 may be rotated about its vertical axis as shown in Figure 6.

In use the control valve is connected in an oil circuit as shown in Figure 3. The port 12 is connected through a conduit 35 with an oil reservoir 36. The port 13 is connected through a conduit 37 with a high pressure pump 38. The reservoir 36 and the pump 38 are also connected to each other. When the parts are in the neutral position shown in Figure 1, the oil is forced inwardly through the port 13, through the passageway 20, through the socket 31 and thence through the passageway 19 and port 12 into the oil reservoir 36. The circulation established by the pump is complete. If it is desired to operate one of the jacks 39 which are connected to the respective ports 14, the handle 33 is raised into the position shown in Figure 7 so that the oil will pass from the passageway 20, through the socket 30 and into the passageway 21. The lever 33 is then pushed into one of the positions shown in Figure 6 in order to bring the port 21 into registration with the selected one of the ports 14. This will immediately raise the selected jack. After this operation has been completed, the lever 33 is depressed through a vertical arc to rotate the valve member 26 into the position shown in Figure 8 in which the socket 32 communicates with all three passageways 19, 20, and 21. The weight of the jack with the weight of the parts supported by the jack will cause the oil to flow back through the socket 32 and thence through the passageway 19 back into the oil reservoir. Attention is called to the fact that the passageway 19 has a considerably greater diameter than that of either passageway 20 or 21. In the release position of the valve the oil is forced upwardly through the passageways 20 and 21 so that the passageway 19 must have a diameter sufficiently large to carry all of the oil to the reservoir without any back pressure. It is thus possible to raise, hold in raised position, or lower the jack while continuously operating the pump.

The parts are all lubricated by the oil which is used in the operation of the valve. This oil is prevented from leaking out from the valve by means of the packing and other tight joints which prevent leakage. A thin film of oil thus surrounds the major portions of the two valve members 15 and 26. The springs 16 and 27 normally maintain just sufficient pressure on the two valve members 15 and 26 to keep them firmly seated within their sockets. The pressure exerted by the pump 38 may, however, set up excessive pressures at the larger ends of the two frusto-conical members so as to make operation difficult or impossible. I find it necessary to provide means for relieving the pressure thus exerted. These pressures are apt to be greatest between the valve member 15 and the plug 11 and between the valve member 26 and the plug 25. In Figure 2 I show an annular groove 40 surrounding the valve member 15, this groove being connected at one side of the valve member through a passageway 41 with the space at the bottom of the valve member 15. As shown in Figure 1, the passageway 41 has an opening into the port 12 so that any oil under excessive pressure will be forced into the oil reservoir. In the same manner, the oil in the annular groove 42 will pass through the passageway 43 and through the space between the valve member 26 and the plug 25 and from thence through the passageway 44. The passageway 44 communicates with the passageway 19 so that any oil which is forced through the passageway 44 will be drained into the oil reservoir.

While my valve control is adapted for use wherever a single control is needed for actuating any one of a plurality of mechanisms, the initial and primary purpose of my valve control is for application to such highway implements as maintainers and snow plows. These implements are often designed for raising and lowering and for tilting in several planes. Usually a plurality of jacks is employed with individual controls in the cab of the truck. Quick decisions on the part of the operator are often required and this is apt to confuse the operator in the selection of the proper control. In my device the decision may be made quickly, and the action of the single control becomes largely reflex. Moreover, the available space within the cab of a truck is exceedingly limited but my device is so compact that it requires very little room.

My invention is shown and described as used in connection with three jacks but it is evident that its usefulness is not thus limited. Whenever there are two or more jacks which should have a single individual control, the valve control as above described will perform the function. The possible number of jacks to be actuated is almost unlimited, being limited only by the amount of space available and the character of the material used in its construction.

Having thus described my invention in such full, clear, and exact terms that its construction and operation will be readily understood by others skilled in the art to which it pertains, what I claim as new and desire to secure by Letters Patent of the United States is:

1. A valve including a stationary female member with a cavity therein, a male member rotatably seated in the cavity of said female member, said female member having a plurality of passages therein in communication with said cavity and said male member having a plurality of passages one of which is adapted to be selectively moved into communication with any one of a group of said plurality of passages in said female member upon rotation of said male member and another of which is continuously in communication with another one of said plurality of passages in said female member, further valve means associated with said male member and controlling the flow between the passages of the male member, and a handle member pivotally secured to said male member, said handle member being operative when moved about its pivotal axis to actuate said further valve means and when moved about the axis of rotation of said male member to rotate said male valve member.

2. A valve including a stationary female member with a cavity therein, a male member rotatably seated in the cavity of said female member, said female member having a plurality of passages therein in communication with said cavity and said male member having a plurality of passages one of which is adapted to be selectively moved into communication with any one of a group of said plurality of passages in said female member upon rotation of said male member and two others of which are continuously in communication with two others of said plurality of passages in said female member, further valve means associated with said male member and controlling the flow between the passages of the male member, and a handle member pivotally secured to said male member, said handle member being operative when moved about its pivotal axis to actuate said further valve means and when moved about the axis of rotation of said male member to rotate said male valve member.

3. A valve including a stationary female member with a cavity therein, a male member rotatably seated in the cavity of said female member, said female member having a plurality of passages therein in communication with said cavity, said male member having a first passage which is adapted to be selectively moved into communication with any one of a group of said plurality of passages in said female member upon rotation of said male member and second and third passages which are continuously in communication with two others of said plurality of passages in said female member, further valve means in said male member and controlling the flow between the passages of the male member, and a handle member pivotally secured to said male member, said handle member being operative when moved about its pivotal axis to cause said further valve means selectively to establish communication between all three of said passages in said male member, between said first and third passages, or between said second and third passages, and said handle member being operative when moved about the axis of rotation of said male member to rotate said male valve member.

ALFRED A. TRAMBLY.